US012651747B2

(12) United States Patent
Kidosaki

(10) Patent No.: US 12,651,747 B2
(45) Date of Patent: Jun. 9, 2026

(54) ELECTRODE FOR ALL-SOLID-STATE BATTERY, ALL-SOLID-STATE BATTERY, AND MANUFACTURING METHODS THEREFOR

(71) Applicant: TOYOTA JIDOSHA KABUSHIKI KAISHA, Toyota (JP)

(72) Inventor: Toru Kidosaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 637 days.

(21) Appl. No.: 18/078,429

(22) Filed: Dec. 9, 2022

(65) Prior Publication Data

US 2023/0290944 A1     Sep. 14, 2023

(30) Foreign Application Priority Data

Mar. 11, 2022     (JP) ................................. 2022-038266

(51) Int. Cl.
| | |
|---|---|
| *H01M 4/525* | (2010.01) |
| *H01M 4/02* | (2006.01) |
| *H01M 4/04* | (2006.01) |
| *H01M 4/38* | (2006.01) |
| *H01M 4/505* | (2010.01) |
| *H01M 4/583* | (2010.01) |

(Continued)

(52) U.S. Cl.
CPC ......... *H01M 4/525* (2013.01); *H01M 4/0416* (2013.01); *H01M 4/386* (2013.01); *H01M 4/387* (2013.01); *H01M 4/505* (2013.01); *H01M 4/583* (2013.01); *H01M 10/0525* (2013.01); *H01M 10/0562* (2013.01); *H01M*

*2004/021* (2013.01); *H01M 2004/027* (2013.01); *H01M 2004/028* (2013.01); *H01M 2300/008* (2013.01)

(58) Field of Classification Search
CPC .................................................. H01M 10/0525
See application file for complete search history.

(56) References Cited

U.S. PATENT DOCUMENTS

| | | | | |
|---|---|---|---|---|
| 2014/0302229 A1* | 10/2014 | Miki | ....................... | H01M 4/62 |
| | | | | 427/58 |
| 2016/0359194 A1* | 12/2016 | Meguro | ............ | H01M 10/0562 |

(Continued)

FOREIGN PATENT DOCUMENTS

| | | |
|---|---|---|
| EP | 4379851 A1 | 6/2024 |
| JP | 2012-221913 A | 11/2012 |

(Continued)

OTHER PUBLICATIONS

Kennedy et al. "Preparation and electrochemical properties of the SiS2âP2S5âLi2S glass coformer system." Journal of the Electro-chemical Society 136.9 (1989): 2441. (Year: 1989).*

*Primary Examiner* — Allison Bourke
*Assistant Examiner* — Kayla Elaine Clary
(74) *Attorney, Agent, or Firm* — Oliff PLC

(57)     ABSTRACT

An electrode for an all-solid-state battery includes an active material, a first solid electrolyte, and a second solid electrolyte. A mean particle diameter of the active material is greater than or equal to 0.01 µm and less than or equal to 0.7 µm. A mean particle diameter of the first solid electrolyte is greater than or equal to 0.01 µm and less than or equal to 0.7 µm. A mean particle diameter of the second solid electrolyte is greater than or equal to 0.7 µm and less than or equal to 2.0 µm.

11 Claims, 1 Drawing Sheet

(51) Int. Cl.
    H01M 10/0525     (2010.01)
    H01M 10/0562     (2010.01)

(56)           References Cited

U.S. PATENT DOCUMENTS

2019/0372156 A1   12/2019   Sakamoto
2022/0200045 A1*   6/2022   Tsuchida .............. H01M 4/139

FOREIGN PATENT DOCUMENTS

| JP | 2013-157084 A | 8/2013 |
| JP | 2014-035818 A | 2/2014 |
| JP | 5720589 B2 | 5/2015 |
| JP | 2019212430 A | 12/2019 |

* cited by examiner

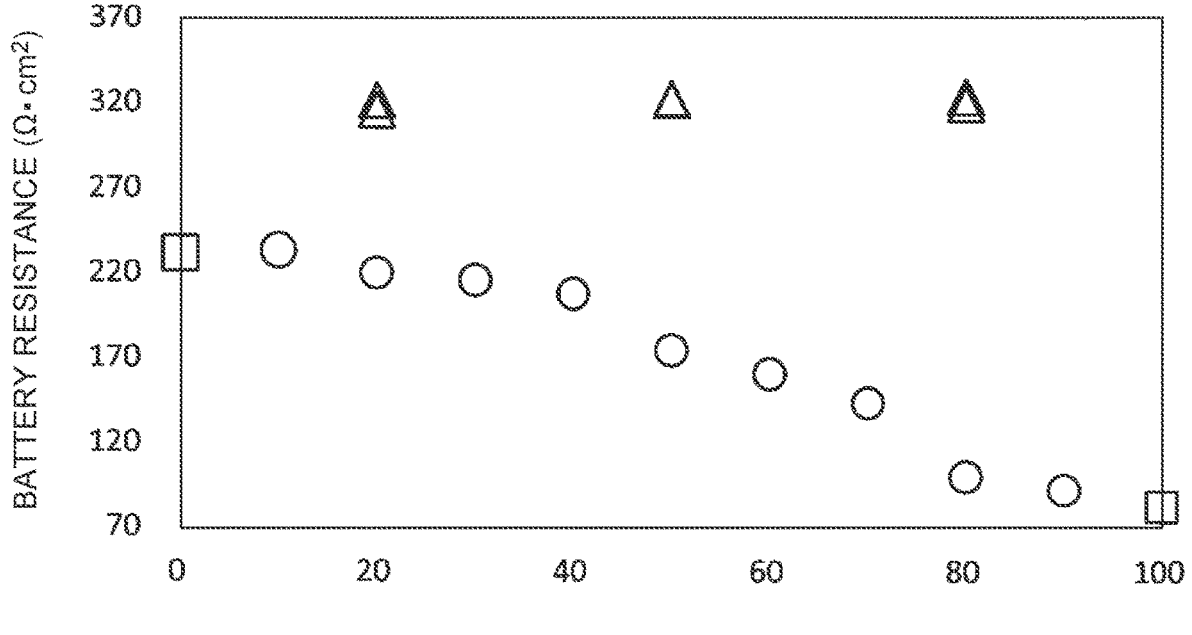

ELECTRODE FOR ALL-SOLID-STATE BATTERY, ALL-SOLID-STATE BATTERY, AND MANUFACTURING METHODS THEREFOR

CROSS-REFERENCE TO RELATED APPLICATION

This application claims priority to Japanese Patent Application No. 2022-038266 filed on Mar. 11, 2022, incorporated herein by reference in its entirety.

BACKGROUND

1. Technical Field

The disclosure relates to an electrode for an all-solid-state battery, an all-solid-state battery, and manufacturing methods therefor.

2. Description of Related Art

With rapid proliferation of information-related equipment, communication equipment, and other equipment, such as personal computers, camcorders, and cellular phones, in recent years, development of batteries used as their power supplies is emphasized. In the automobile industry and other industries as well, development of high-power, high-capacity batteries for battery electric vehicles and hybrid electric vehicles is in progress. Currently, among various kinds of batteries, a lithium ion battery has become a focus of attention from the viewpoint of high energy density.

Currently commercially available lithium ion batteries use an electrolyte containing a flammable organic solvent. For this reason, there is a need for improvement in terms of installation of a safety device to suppress a temperature rise in the event of a short circuit and a structure and material for preventing a short circuit. In contrast, all-solid-state batteries in which an electrolyte is replaced with a solid electrolyte layer to modify the batteries into an all-solid structure do not use a flammable organic solvent in the batteries, so a safety device is simplified. Thus, all-solid-state batteries presumably excel in low manufacturing cost and high productivity.

In recent years, various technologies have been developed to improve the performance of all-solid-state batteries. Among the technologies, there is a technology to reduce the battery resistance in order to improve output power. For example, Japanese Unexamined Patent Application Publication No. 2013-157084 (JP 2013-157084 A) describes an all-solid-state battery that includes a solid electrolyte layer containing two-type solid electrolytes respectively having different mean particle diameters.

SUMMARY

The inventor applied the technology described in JP 2013-157084 A to an electrode in order to further reduce the battery resistance. As a result, it was confirmed that the battery resistance did not decrease. The inventor estimated the reason for this result due to an insufficient amount of solid electrolyte in contact with an electrode active material.

The disclosure provides an electrode for an all-solid-state battery, capable of reducing the battery resistance, an all-solid-state battery, and manufacturing methods therefor.

A first aspect of the disclosure relates to an electrode for an all-solid-state battery. The electrode includes an active material, a first solid electrolyte, and a second solid electrolyte. A mean particle diameter of the active material is greater than or equal to 0.01 μm and less than or equal to 0.7 μm. A mean particle diameter of the first solid electrolyte is greater than or equal to 0.01 μm and less than or equal to 0.7 μm. A mean particle diameter of the second solid electrolyte is greater than or equal to 0.7 μm and less than or equal to 2.0 μm.

In the electrode, a ratio of a volume of the first solid electrolyte to a total volume of the first solid electrolyte and the second solid electrolyte may be higher than or equal to 20 vol % and lower than or equal to 80 vol %. The mean particle diameter of the first solid electrolyte may be less than or equal to 0.5 μm. The mean particle diameter of the second solid electrolyte may be greater than or equal to 1.0 μm.

A second aspect of the disclosure relates to an all-solid-state battery. The all-solid-state battery includes a first electrode, a second electrode, and a solid electrolyte layer disposed between the first electrode and the second electrode. The first electrode is the above-described electrode for an all-solid-state battery.

In the all-solid-state battery, the active material may be a positive electrode active material and may be at least one of lithium cobalt oxide, lithium nickel cobalt aluminum oxide, lithium nickel cobalt manganese oxide, and lithium manganese oxide.

In the all-solid-state battery, the active material may be a negative electrode active material and may be at least one of Si, Si alloys, tin, tin alloys, silicon-based active materials, carbon-based active materials, oxide-based active materials, metal lithium, and lithium alloys.

In the all-solid-state battery, the first solid electrolyte may be at least one of a sulfide solid electrolyte, an oxide solid electrolyte, a nitride solid electrolyte, and a halide solid electrolyte.

In the all-solid-state battery, the first solid electrolyte may be the sulfide solid electrolyte, the sulfide solid electrolyte may contain $Li_2S$ and $P_2S_5$, and a ratio of $Li_2S$ to a sum of $Li_2S$ and $P_2S_5$ may range from 70 mol % to 80 mol %.

In the all-solid-state battery, the first solid electrolyte may be the sulfide solid electrolyte, the sulfide solid electrolyte may contain $Li_2S$ and $SiS_2$, and a ratio of $Li_2S$ to a sum of $Li_2S$ and $SiS_2$ may range from 60 mol % to 72 mol %.

In the all-solid-state battery, the second solid electrolyte may be the same type of solid electrolyte as the first solid electrolyte.

A third aspect of the disclosure relates to a manufacturing method for an electrode for an all-solid-state battery. The manufacturing method includes a slurry preparation step of preparing slurry by mixing an active material, a first solid electrolyte, a second solid electrolyte, and a dispersion medium, an application step of applying the prepared slurry to a base material, and a drying step of drying the slurry applied to the base material. A mean particle diameter of the active material is greater than or equal to 0.01 μm and less than or equal to 0.7 μm. A mean particle diameter of the first solid electrolyte is greater than or equal to 0.01 μm and less than or equal to 0.7 μm. A mean particle diameter of the second solid electrolyte is greater than or equal to 0.7 μm and less than or equal to 2.0 μm.

In the manufacturing method, a ratio of a volume of the first solid electrolyte to a total volume of the first solid electrolyte and the second solid electrolyte may be higher than or equal to 20 vol % and lower than or equal to 80 vol %. The mean particle diameter of the first solid electrolyte may be less than or equal to 0.5 μm. The mean particle diameter of the second solid electrolyte may be greater than or equal to 1.0 μm.

A fourth aspect of the disclosure relates to a manufacturing method for an all-solid-state battery. The manufacturing method includes a first step of preparing a first electrode, a second step of preparing a second electrode, a third step of preparing a solid electrolyte layer, and a fourth step of laminating the first electrode, the second electrode, and the solid electrolyte layer such that the solid electrolyte layer is disposed between the first electrode and the second electrode. The first step is the above-described manufacturing method for an electrolyte for an all-solid-state battery.

According to the aspects of the disclosure, it is possible to reduce the battery resistance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 shows the results of battery resistance evaluation.

DETAILED DESCRIPTION OF EMBODIMENTS

Electrode for all-Solid-State Battery

The inventor diligently studied and found that it was possible to reduce the battery resistance by using two-type solid electrolytes with different mean particle diameters for an electrode and using an active material with a small mean particle diameter. This is presumably because the contact area between the solid electrolytes and the active material has increased. The electrode for an all-solid-state battery according to the disclosure was devised based on the findings. Hereinafter, the details will be described.

The electrode for an all-solid-state battery according to the disclosure includes an active material, a first solid electrolyte, and a second solid electrolyte. A mean particle diameter of the active material is greater than or equal to 0.01 μm and less than or equal to 0.7 μm. A mean particle diameter of the first solid electrolyte is greater than or equal to 0.01 μm and less than or equal to 0.7 μm. A mean particle diameter of the second solid electrolyte is greater than or equal to 0.7 μm and less than or equal to 2.0 μm.

Active Material

The active material may be a positive electrode active material or may be a negative electrode active material. When the electrode is a positive electrode, a positive electrode active material is used. When the electrode is a negative electrode, a negative electrode active material is used.

The positive electrode active material may be selected as needed from among active materials applicable to a lithium ion all-solid-state battery. Examples of the positive electrode active material include lithium cobalt oxide, lithium nickel cobalt aluminum oxide (NCA), lithium nickel cobalt manganese oxide (NCM), and lithium manganese oxide. The surface of the positive electrode active material may be coated with an oxide layer, such as a lithium niobate layer, a lithium titanate layer, and a lithium phosphate layer.

The negative electrode active material may be selected as needed from among active materials applicable to a lithium ion all-solid-state battery. Examples of the negative electrode active material include Si, Si alloys, tin, tin alloys, silicon-based active materials, such as silicon oxides, carbon-based active materials, such as graphite and hard carbon, oxide-based active materials, such as lithium titanate, metal lithium, and lithium alloys.

The mean particle diameter of the active material is greater than or equal to 0.01 μm and less than or equal to 0.7 μm. When the mean particle diameter of the active material falls within this range, it is possible to increase the contact area between the active material and each of the first solid electrolyte and the second solid electrolyte, with the result that it is possible to reduce the battery resistance. When the mean particle diameter of the active material is less than 0.01 μM, preparation of the electrode is difficult. When the mean particle diameter of the active material exceeds 0.7 μM, a prominent change may be unable to be expected. The mean particle diameter of the active material may be greater than or equal to 0.1 μm or may be greater than or equal to 0.4 μm.

Here, the "mean particle diameter" in the specification is a median diameter ($D_{50}$) obtained from the result of particle size distribution measurement with a laser diffraction scattering method.

The content of the active material is not limited and may be set as needed according to a purpose. The content of the active material may, for example, range from 10 wt % to 90 wt %.

Solid Electrolyte

The electrode contains two-type solid electrolytes (the first solid electrolyte and the second solid electrolyte) with different mean particle diameters as a solid electrolyte. Thus, it is possible to reduce the battery resistance, and it is possible to improve the packing efficiency.

First Solid Electrolyte

The first solid electrolyte may be selected as needed from among solid electrolytes applicable to a lithium ion all-solid-state battery. Examples of the first solid electrolyte include inorganic solid electrolyte particles, such as a sulfide solid electrolyte, an oxide solid electrolyte, a nitride solid electrolyte, and a halide solid electrolyte. From the viewpoint of improving ion conductivity, the sulfide solid electrolyte may be used as the first solid electrolyte.

The sulfide solid electrolyte contains elemental Li, elemental M (M is preferably at least one of P, Ge, Si, Sn, B, and Al), and elemental S. The sulfide solid electrolyte may further contain a halogen. Examples of the halogen include elemental F, elemental Cl, elemental Br, and elemental I. An amorphous sulfide solid electrolyte may further contain elemental O.

Examples of the sulfide solid electrolyte include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z is any one of Ge, Zn, and Ga), $Li_2S$—$GeS_2$, $Li_2S$—$SiS_2$—$Li_3PO_4$, $Li_2S$—$SiS_2$-$Li_xMO_y$ (where x and y are positive numbers, and M is any one of P, Si, Ge, B, Al, Ga, and In).

When the sulfide solid electrolyte contains $Li_2S$ and $P_2S_5$, the ratio of $Li_2S$ to the sum of $Li_2S$ and $P_2S_5$ may range from 70 mol % to 80 mol %, may range from 72 mol % to 78 mol %, or may range from 74 mol % to 76 mol %. This is because the sulfide solid electrolyte may be a sulfide solid electrolyte with an ortho composition or a composition close to the ortho composition and may be a sulfide solid electrolyte with high chemical stability. Here, ortho generally means the one having the highest degree of hydration among oxo acids obtained by hydrating the same oxides. In the specification, a crystal composition to which the largest number of $Li_2S$ are added among sulfides is called ortho composition. In the $Li_2S$—$P_2S_5$ system, $Li_3PS_4$ corresponds to an ortho composition. In the case of $Li_2S$—$P_2S_5$-system sulfide solid electrolyte particles, the ratio between $Li_2S$ and $P_2S_5$ that provides an ortho composition is $Li_2S$:$P_2S_5$=75:25 in mole. When $Al_2S_3$ or $B_2S_3$ is used instead of $P_2S_5$ as well, the ratio of $Li_2S$ may fall within the above ranges. In the $Li_2S$—$Al_2S_3$ system, $Li_3AlS_3$ corresponds to an ortho composition, and, in the $Li_2S$—$B_2S_3$ system, $Li_3BS_3$ corresponds to an ortho composition.

When the sulfide solid electrolyte contains $Li_2S$ and $SiS_2$, the ratio of $Li_2S$ to the sum of $Li_2S$ and $SiS_2$ may range from 60 mol % to 72 mol %, may range from 62 mol % to 70 mol %, or may range from 64 mol % to 68 mol %. This is because the sulfide solid electrolyte may be a sulfide solid electrolyte with an ortho composition or a composition close to the ortho composition and may be a sulfide solid electrolyte with high chemical stability. In the $Li_2S$—$SiS_2$ system, $Li_4SiS_4$ corresponds to an ortho composition. In the case of $Li_2S$—$SiS_2$-system sulfide solid electrolyte, the ratio between $Li_2S$ and $SiS_2$ that provides an ortho composition is $Li_2S$:$SiS_2$=66.3:33.3 in mole. When $GeS_2$ is used instead of $SiS_2$ as well, the ratio of $Li_2S$ may fall within the above ranges. In the $Li_2S$—$GeS_2$ system, $Li_4GeS_4$ corresponds to an ortho composition.

When the sulfide solid electrolyte contains LiX (X=F, Cl, Br, or I), the ratio of LiX, for example, may range from 1 mol % to 60 mol %, may range from 5 mol % to 50 mol %, or may range from 10 mol % to 40 mol %. When the sulfide solid electrolyte contains $Li_2O$, the ratio of $Li_2O$, for example, may range from 1 mol % to 25 mol % or may range from 3 mol % to 15 mol %.

The sulfide solid electrolyte may be sulfide glass, may be crystallized sulfide glass, or may be a crystalline material obtained by a solid phase method.

Examples of the oxide solid electrolyte include lithium lanthanum zirconium composite oxide (LLZO), Al-doped-LLZO, lithium lanthanum titanium composite oxide (LLTO), Al-doped-LLTO, and lithium phosphate oxynitride (LIPON). Examples of the nitride solid electrolyte include $Li_3N$, and $Li_3N$—LiI—LiOH. Examples of the halide solid electrolyte include LiF, LiCl, LiBr, LiI, and LiI—$Al_2O_3$.

The mean particle diameter of the first solid electrolyte is greater than or equal to 0.01 μm and less than or equal to 0.7 μm. When the mean particle diameter of the first solid electrolyte falls within the above range, it is possible to increase the contact area between the active material and each of the first solid electrolyte and the second solid electrolyte, with the result that it is possible to reduce the battery resistance. When the mean particle diameter of the first solid electrolyte is less than 0.01 μm, preparation of the electrode can be difficult. When the mean particle diameter of the first solid electrolyte exceeds 0.7 μm, a prominent change may be unable to be expected. The mean particle diameter of the first solid electrolyte may be greater than or equal to 0.1 μm, may be less than or equal to 0.7 μm, or may be less than or equal to 0.5 μm.

A known grinding method may be applied as needed as a method of adjusting the mean particle diameter of the first solid electrolyte. Examples of the grinding method include media grinding, jet grinding, and cavitation grinding. A grinder mill is not limited. Examples of the grinder mill include a bead mill and a planetary ball mill. A grinding condition may be set as needed to obtain a first solid electrolyte with a desired mean particle diameter.

The BET specific surface area of the first solid electrolyte is not limited. For example, the BET specific surface area of the first solid electrolyte may be greater than or equal to 20

$m^2$/g or may be less than or equal to 40 $m^2$/g. When the BET specific surface area of the first solid electrolyte is less than 20 $m^2$/g, the particle diameters are large, so the advantageous effect may be difficult to be obtained. When the BET specific surface area of the first solid electrolyte exceeds 40 $m^2$/g, the particle diameters are small, so preparation of the electrode may be more difficult.

The BET specific surface area is able to be measured by a BET method.

Second Solid Electrolyte

The second solid electrolyte may be selected as needed from among solid electrolytes applicable to a lithium ion all-solid-state battery. The second solid electrolyte may be selected as needed from among, for example, solid electrolytes applicable to the first solid electrolyte. However, the second solid electrolyte may be the same type of solid electrolyte as the first solid electrolyte or may be a different type of solid electrolyte from the first solid electrolyte.

The mean particle diameter of the second solid electrolyte is greater than or equal to 0.7 μm and less than or equal to 2.0 μm. When the mean particle diameter of the second solid electrolyte falls within the above range, it is possible to increase the contact area between the active material and each of the first solid electrolyte and the second solid electrolyte, with the result that it is possible to reduce the battery resistance. When the mean particle diameter of the second solid electrolyte is less than 0.7 μm, the electrolyte particles have fine particle diameters, so the contact area can reduce. When the mean particle diameter of the second solid electrolyte exceeds 2.0 μm, the contact area can reduce similarly. The mean particle diameter of the second solid electrolyte may be greater than or equal to 1.0 μm or may be less than or equal to 1.6 μm.

Here, the second solid electrolyte has a greater mean particle diameter than the first solid electrolyte. For example, when the mean particle diameter of the second solid electrolyte is 0.7 μm, the mean particle diameter of the first solid electrolyte is set to less than 0.7 μm. When the mean particle diameter of the first solid electrolyte is 0.7 μm, the mean particle diameter of the second solid electrolyte is set to greater than 0.7 μm. A difference in mean particle diameter between the first solid electrolyte and the second solid electrolyte may be, for example, greater than or equal to 0.1 μm, may be greater than or equal to 0.3 μm, may be greater than or equal to 0.5 μm, may be less than or equal to 1.9 μm, may be less than or equal to 1.7 μm, or may be less than or equal to 1.5 μm.

A known grinding method may be applied as needed as a method of adjusting the mean particle diameter of the second solid electrolyte. Examples of the grinding method include media grinding, jet grinding, and cavitation grinding. A grinder mill is not limited. Examples of the grinder mill include a bead mill and a planetary ball mill. A grinding condition may be set as needed to obtain a second solid electrolyte with a desired mean particle diameter.

The BET specific surface area of the second solid electrolyte is not limited. For example, the BET specific surface area of the second solid electrolyte may be greater than or equal to 5 $m^2$/g or may be less than or equal to 15 $m^2$/g. When the BET specific surface area of the second solid electrolyte is less than 5 $m^2$/g, the particle diameters are large, so the contact area may reduce. When the BET specific surface area of the second solid electrolyte exceeds 15 $m^2$/g, the contact area may also similarly reduce.

Content of First Solid Electrolyte and Second Solid Electrolyte

The total content of the first solid electrolyte and the second solid electrolyte is not limited and may be set as needed. For example, the total content of the first solid electrolyte and the second solid electrolyte may range from 1 wt % to 90 wt %.

Ratio Between First Solid Electrolyte and Second Solid Electrolyte

The ratio between the first solid electrolyte and the second solid electrolyte is not limited. For example, the ratio of the volume of the first solid electrolyte to the total volume (100 vol %) of the first solid electrolyte and the second solid electrolyte may be higher than or equal to 10 vol %, may be higher than or equal to 20 vol %, may be higher than or equal to 50 vol %, may be lower than 100 vol %, may be lower than or equal to 90 vol %, may be lower than or equal to 80 vol %, or may be lower than or equal to 70 vol %. As the ratio of the volume of the first solid electrolyte increases, the battery resistance is reduced. However, when the ratio of the volume of the first solid electrolyte is too high, the viscosity of slurry used at the time of preparation of the electrode increases, so coatability and formability decrease. From the viewpoint of reduction in battery resistance and improvement in coatability and formability, the ratio of the volume of the first solid electrolyte may be higher than or equal to 20 vol % and lower than or equal to 80 vol % or may be higher than or equal to 50 vol % and lower than or equal to 80 vol %.

Other Components

The electrode for an all-solid-state battery may optionally include an electrically conductive agent. The electrically conductive agent may be selected as needed from among electrically conductive agents applicable to a lithium ion all-solid-state battery. Examples of the electrically conductive agent include carbon materials, such as acetylene black, Ketjen black, and vapor grown carbon fiber (VGCF), and metal materials, such as nickel, aluminum, and stainless steel. The content of the electrically conductive agent is not limited. The content of the electrically conductive agent, for example, ranges from 0.1 wt % to 10 wt %.

The electrode for an all-solid-state battery may optionally include a binder. The binder may be selected as needed from among binders applicable to a lithium ion all-solid-state battery. Examples of the binder include butadiene rubber (BR), butylene rubber (IIR), acrylate butadiene rubber (ABR), styrene-butadiene rubber (SBR), polyvinylidene difluoride (PVdF), and polyvinylidene difluoride-hexafluoropropylene copolymer (PVdF-HFP). The content of the binder is not limited. The content of the binder, for example, ranges from 0.1 wt % to 10 wt %.

Electrode

The electrode may be a positive electrode or may be a negative electrode. The shape of the electrode is not limited and may be a sheet shape. The thickness of the electrode is not limited. The thickness of the electrode may be, for example, greater than or equal to 0.1 μm and less than or equal to 1 mm.

A manufacturing method for the electrode is not limited. For example, the electrode may be manufactured by mixing materials that make up the electrode and pressing the mixed materials. Alternatively, the electrode may be manufactured by dispersing materials that make up the electrode into a dispersant to form slurry, then applying the slurry to a predetermined base material, and drying the slurry applied to the base material. The method of manufacturing the electrode by using slurry will be described in detail later.

In the electrode for an all-solid-state battery according to the disclosure, when the mean particle diameters of the active material, first solid electrolyte, and second solid electrolyte are respectively adjusted within predetermined ranges, it is possible to increase the contact area between the active material and the solid electrolyte (the first solid electrolyte and the second solid electrolyte), so it is possible to reduce the battery resistance.

All-Solid-State Battery

The all-solid-state battery according to the disclosure includes the above-described electrode for an all-solid-state battery. Specifically, the all-solid-state battery according to the disclosure includes a first electrode, a second electrode, and a solid electrolyte layer disposed between the first electrode and the second electrode. The first electrode is the above-described electrode for an all-solid-state battery. Since the all-solid-state battery according to the disclosure includes the above-described electrode for an all-solid-state battery, it is possible to reduce the battery resistance.

First Electrode

A first electrode is the electrode for an all-solid-state battery, so the description thereof is omitted.

Second Electrode

A second electrode is a negative electrode when the first electrode is a positive electrode. The second electrode is a positive electrode when the first electrode is a negative electrode.

When the second electrode is a positive electrode, the second electrode contains a positive electrode active material. The positive electrode active material is not limited and may be selected as needed from among positive electrode active materials applicable to a lithium ion all-solid-state battery. Examples of the positive electrode active material include positive electrode active materials applicable to the above-described electrode for an all-solid-state battery. When the second electrode is a negative electrode, the second electrode contains a negative electrode active material. The negative electrode active material is not limited and may be selected as needed from among negative electrode active materials applicable to a lithium ion all-solid-state battery. Examples of the negative electrode active material include negative electrode active materials applicable to the above-described electrode for an all-solid-state battery. The content of the positive electrode active material or the negative electrode active material in the second electrode is not limited. The content of the positive electrode active material or the negative electrode active material may, for example, range from 10 wt % to 90 wt %.

The second electrode may optionally contain a solid electrolyte. The solid electrolyte is not limited and may be selected as needed from among solid electrolytes applicable to a lithium ion all-solid-state battery. Examples of the solid electrolyte include solid electrolytes applicable to the above-described electrode for an all-solid-state battery. The content of the solid electrolyte in the second electrode is not limited. The content of the solid electrolyte may, for example, range from 1 wt % to 90 wt %.

The second electrode may optionally contain an electrically conductive agent. The electrically conductive agent is not limited and may be selected as needed from among electrically conductive agents applicable to a lithium ion all-solid-state battery. Examples of the electrically conductive agent include electrically conductive agents applicable to the above-described electrode for an all-solid-state battery. The content of the electrically conductive agent in the second electrode is not limited. The content of the electrically conductive agent may, for example, range from 0.1 wt % to 10 wt %.

The second electrode may optionally contain a binder. The binder is not limited and may be selected as needed from among binders applicable to a lithium ion all-solid-state battery. Examples of the binder include binders applicable to the above-described electrode for an all-solid-state battery. The content of the binder in the second electrode is not limited. The content of the binder may, for example, range from 0.1 wt % to 10 wt %.

The shape of the second electrode is not limited and may be a sheet shape. The thickness of the second electrode is not limited. The thickness of the second electrode may be, for example, greater than or equal to 0.1 μm and less than or equal to 1 mm.

Solid Electrolyte Layer

The solid electrolyte layer includes a solid electrolyte. The solid electrolyte is not limited and may be selected as needed from among solid electrolytes applicable to a lithium ion all-solid-state battery. Examples of the solid electrolyte include solid electrolytes applicable to the above-described electrode for an all-solid-state battery. The content of the solid electrolyte in the solid electrolyte layer is not limited. The content of the solid electrolyte may, for example, range from 50 wt % to 99 wt %.

The solid electrolyte layer may optionally contain a binder. The binder is not limited and may be selected as needed from among binders applicable to a lithium ion all-solid-state battery. Examples of the binder include binders applicable to the above-described electrode for an all-solid-state battery. The content of the binder in the solid electrolyte layer is not limited. The content of the binder may, for example, range from 0.1 wt % to 10 wt %.

The shape of the solid electrolyte layer is not limited and may be a sheet shape. The thickness of the solid electrolyte layer is not limited. The thickness of the solid electrolyte layer may be, for example, greater than or equal to 0.1 μm and less than or equal to 1 mm.

Other Members

The all-solid-state battery may optionally include a current collector (a positive electrode current collector and a negative electrode current collector). The material of the current collector is not limited and may be selected as needed from among known materials according to a purpose. Examples of the current collector include Cu, Ni, Cr, Au, Pt, Ag, Al, Fe, Ti, Zn, Co, and stainless steel. The thickness of the current collector is not limited and may be set as needed according to desired battery performance. The thickness of the current collector may be, for example, greater than or equal to 0.1 μm and less than or equal to 1 mm.

The all-solid-state battery according to the disclosure may be a single cell or may be a layer-built cell. The layer-built cell may be a monopolar layer-built cell (parallel-connected layer-built cell) or may be a bipolar layer-built cell (series connected layer-built cell). Examples of the shape of the all-solid-state battery include a coin shape, a laminate shape, a cylindrical shape, and a square shape.

Manufacturing Method for Electrode for All-Solid-State Battery

The manufacturing method for the electrode for an all-solid-state battery according to the disclosure includes a slurry preparation step of preparing slurry by mixing an active material, a first solid electrolyte, a second solid electrolyte, and a dispersion medium, an application step of applying the prepared slurry to a base material, and a drying step of drying the slurry applied to the base material. A mean particle diameter of the active material is greater than or equal to 0.01 μm and less than or equal to 0.7 μm. A mean particle diameter of the first solid electrolyte is greater than or equal to 0.01 μm and less than or equal to 0.7 μm. A mean particle diameter of the second solid electrolyte is greater than or equal to 0.7 μm and less than or equal to 2.0 μm.

Slurry Preparation Step

The slurry preparation step is a step of preparing slurry by mixing an active material, a first solid electrolyte, a second solid electrolyte, and a dispersion medium. The type, content, and the like of each of the active material, the first solid electrolyte, and the second solid electrolyte have been described above, so the description is omitted here. The dispersion medium is not limited, and a known organic solvent may be used. Examples of the known organic solvent include hexane and di-isobutyl ketone (DIBK).

The viscosity of the slurry is not limited and may be, for example, higher than or equal to 100 mPa·s and lower than or equal to 5000 mPa·s. When the viscosity of the slurry exceeds 5000 mPa·s, the coatability and formability of the slurry deteriorate. From the viewpoint of further improvement in the coatability and formability of the slurry, the viscosity of the slurry may be lower than or equal to 3000 mPa·s or may be lower than or equal to 2000 mPa·s.

In the specification, a value measured by the following method will be used as the viscosity of the slurry. One milliliter of the prepared slurry is sampled, and the viscosity of the slurry at a shear rate of 38.35-1 is measured by using an E-type viscosimeter.

The solid fraction of the slurry is not limited and may be set as needed. The solid fraction of the slurry may be, for example, higher than or equal to 10 wt % or may be lower than or equal to 80 wt %.

Application Step

The application step is a step of applying the prepared slurry to a base material. The base material to which the slurry is applied is not limited. The base material may be a metal foil, a current collector, or a solid electrolyte layer. The application method may be performed by a known method. Examples of the known method include doctor blade, die coating, gravure coating, spray coating, electrostatic coating, and bar coating.

Drying Step

The drying step is a step of drying slurry applied to the base material. The drying step may be performed by a known method. Examples of the known method include heating the slurry to a temperature higher than or equal to 50° C. and lower than or equal to 200° C. In addition, the atmosphere may be set to an inactive atmosphere or a decompressed atmosphere.

Manufacturing Method for all-Solid-State Battery

The manufacturing method for an all-solid-state battery according to the disclosure includes a first electrode preparation step of preparing a first electrode, a second electrode preparation step of preparing a second electrode, a solid electrolyte layer preparation step of preparing a solid electrolyte layer, and a laminating step of laminating the first electrode, the second electrode, and the solid electrolyte layer such that the solid electrolyte layer is disposed between the first electrode and the second electrode. The first electrode preparation step is the above-described manufacturing method for an electrode for an all-solid-state battery.

First Electrode Preparation Step

The first electrode preparation step is the above-described manufacturing method for an electrode for an all-solid-state battery, so the description is omitted here.

Second Electrode Preparation Step

The second electrode preparation step is able to be performed by a known method. For example, the second electrode may be manufactured by mixing materials that make up the second electrode and pressing the mixed materials. Alternatively, the electrode may be manufactured by dispersing materials that make up the second electrode into a dispersant to form slurry, then applying the slurry to a predetermined base material, and drying the slurry applied to the base material.

Solid Electrolyte Layer Preparation Step

The solid electrolyte layer preparation step is able to be performed by a known method. For example, the solid electrolyte layer may be manufactured by mixing materials that make up the solid electrolyte layer and pressing the mixed materials. Alternatively, the solid electrolyte layer may be manufactured by dispersing materials that make up the solid electrolyte layer into a dispersant to form slurry, then applying the slurry to a predetermined base material, and drying the slurry applied to the base material.

Laminating Step

The laminating step is a step of laminating the first electrode, the second electrode, and the solid electrolyte layer such that the solid electrolyte layer is disposed between the first electrode and the second electrode. In the laminating step, these layers may be simply laminated or may be pressed after being laminated. A pressing method is not limited. Examples of the pressing method include roll press and flat plate press. A linear pressure to be applied in roll press may be, for example, higher than or equal to 1 t/cm or lower than or equal to 10 t/cm. A contact pressure to be applied in flat plate press may be, for example, higher than or equal to 800 MPa or may be lower than or equal to 3000 MPa.

Where necessary, for example, after the laminating step or before the laminating step, a negative electrode current collector may be disposed on the surface of a negative electrode active material layer, and a positive electrode current collector may be disposed on the surface of a positive electrode active material layer.

Preparation of all-Solid-State Battery

As will be described below, all-solid-state batteries according to Examples 1 to 81, Reference Examples 1 to 18, and Comparative Examples 1 to 18 were prepared. Table 1 to Table 3 show the physical properties of the components.

Examples 1 to 9

Preparation of Sulfide Solid Electrolyte

A raw material composition was obtained by weighing $Li_2S$ and $P_2S_5$ such that $Li_2S:P_2S_5=75:25$ molar ratio. The raw material composition and tetrahydrofuran with a weight ratio of 20 to one were put in a glass container and stirred for 72 hours at 25° C., and then the precipitated powder was collected as a precursor of a sulfide solid electrolyte. The collected precursor was dried at 25° C. in an argon atmosphere and then fired (first firing) for an hour at 100° C. in an atmospheric pressure (open system). The obtained fired product was vacuum-encapsulated in a quartz tube, the quartz tube was fired (second firing) for 12 hours at 140° C. in a muffle furnace, and a sulfide solid electrolyte was prepared. The mean particle diameter was adjusted by grinding the obtained sulfide solid electrolyte with a planetary ball mill (made by FRITSCH) to prepare a first solid electrolyte and a second solid electrolyte used in Examples 1 to 9.

Negative Electrode Preparation Step 18.6 g of the negative electrode active material particles (Si), 0.09 g of the first solid electrolyte, 8.6 g of the second solid electrolyte, 2.4 g of the electrically conductive agent (VGCF), and the binder (SBR) diluted to 5 wt % were put into a dispersion medium (DIBK) and mixed. The volume ratio between the first solid electrolyte and the second solid electrolyte was 10:90 (vol %). The solid fraction was 43 wt %. FILMIX was used as a kneader, these materials were kneaded within the range of a peripheral speed of 5 m/s to 30 m/s, and negative electrode slurry was prepared. A high-shear PC wheel was used for FILMIX. The viscosity of the prepared negative electrode slurry was measured. The slurry viscosity shown in Table 1 is the mean value of the slurry viscosities of Examples 1 to 9.

The negative electrode slurry was applied onto a negative electrode current collector by blade coating with an applicator, dried for 30 minutes at 100° C., and a negative electrode having a negative electrode layer on the negative electrode current collector was obtained.

Positive Electrode Preparation Step 80.0 g of the positive electrode active material ($LiNi_{1/3}Co_{1/3}Mn_{1/3}O_2$), 9.51 g of the sulfide solid electrolyte (LPS), and 2.0 g of the electrically conductive agent (VGCF) were sampled into a FILMIX vessel. After that, SBR serving as a binder diluted to 5 wt % and 32.21 g of tetralin serving as a dispersion medium were added into the vessel to obtain a solid content of 69 wt %. FILMIX was used as a kneader, these materials were kneaded within the range of a peripheral speed of 5 m/s to 30 m/s, and positive electrode layer paste was prepared. The prepared positive electrode layer paste was applied onto a positive electrode current collector by blade coating with an applicator, dried for 30 minutes at 100° C., and an electrode layer having a positive electrode layer on the positive electrode current collector was obtained.

Solid Electrolyte Layer Preparation Step

Forty grams of the sulfide solid electrolyte (LPS), 8.00 g of a solution obtained by dissolving 5 wt % of ABR into a heptane solution, 25.62 g of heptane and 8.00 g of dibutyl ether both serving as a solvent were mixed and kneaded with an ultrasonic homogenizer. The obtained solid electrolyte layer paste was applied onto an Al foil current collector by blade coating with an applicator, dried for 30 minutes at 100° C., and an electrode having a solid electrolyte layer was obtained.

Laminating Step

The negative electrode, the positive electrode, and the solid electrolyte layer were laminated such that the solid electrolyte layer was disposed between the negative electrode and the positive electrode, various current collectors and terminals were attached, and all-solid-state batteries of Examples 1 to 9 were prepared.

Examples 10 to 18

In the negative electrode preparation step, except that the weight of the first solid electrolyte was changed to 1.9 g, the weight of the second solid electrolyte was changed to 7.6 g, the volume ratio between the first solid electrolyte and the second solid electrolyte was changed to 20:80 (vol %), and the solid fraction was changed to 42 wt %, all-solid-state batteries of Examples 10 to 18 were prepared by a method similar to Examples 1 to 9.

Examples 19 to 27

In the negative electrode preparation step, except that the weight of the first solid electrolyte was changed to 2.8 g, the weight of the second solid electrolyte was changed to 6.7 g, the volume ratio between the first solid electrolyte and the second solid electrolyte was changed to 30:70 (vol %), and the solid fraction was changed to 41 wt %, all-solid-state batteries of Examples 19 to 27 were prepared by a method similar to Examples 1 to 9.

Examples 28 to 36

In the negative electrode preparation step, except that the weight of the first solid electrolyte was changed to 3.8 g, the weight of the second solid electrolyte was changed to 5.7 g, the volume ratio between the first solid electrolyte and the second solid electrolyte was changed to 40:60 (vol %), and the solid fraction was changed to 38 wt %, all-solid-state batteries of Examples 28 to 36 were prepared by a method similar to Examples 1 to 9.

Examples 37 to 45

In the negative electrode preparation step, except that the weight of the first solid electrolyte was changed to 4.7 g, the weight of the second solid electrolyte was changed to 4.8 g, the volume ratio between the first solid electrolyte and the second solid electrolyte was changed to 50:50 (vol %), and the solid fraction was changed to 36 wt %, all-solid-state batteries of Examples 37 to 45 were prepared by a method similar to Examples 1 to 9.

Examples 46 to 54

In the negative electrode preparation step, except that the weight of the first solid electrolyte was changed to 5.6 g, the weight of the second solid electrolyte was changed to 3.8 g, the volume ratio between the first solid electrolyte and the second solid electrolyte was changed to 60:40 (vol %), and the solid fraction was changed to 34 wt %, all-solid-state batteries of Examples 46 to 54 were prepared by a method similar to Examples 1 to 9.

Examples 55 to 63

In the negative electrode preparation step, except that the weight of the first solid electrolyte was changed to 6.6 g, the weight of the second solid electrolyte was changed to 2.9 g, the volume ratio between the first solid electrolyte and the second solid electrolyte was changed to 70:30 (vol %), and the solid fraction was changed to 32 wt %, all-solid-state batteries of Examples 55 to 63 were prepared by a method similar to Examples 1 to 9. Note that, the all-solid-state batteries of Examples 58 to 60 were prepared by using the second solid electrolytes respectively having the mean particle diameters of 0.47 μm, 0.5 μm and 0.63 μm.

Examples 64 to 72

In the negative electrode preparation step, except that the weight of the first solid electrolyte was changed to 7.5 g, the weight of the second solid electrolyte was changed to 1.9 g, the volume ratio between the first solid electrolyte and the second solid electrolyte was changed to 80:20 (vol %), and the solid fraction was changed to 30 wt %, all-solid-state batteries of Examples 64 to 72 were prepared by a method similar to Examples 1 to 9.

Examples 73 to 81

In the negative electrode preparation step, except that the weight of the first solid electrolyte was changed to 8.5 g, the weight of the second solid electrolyte was changed to 1.0 g, the volume ratio between the first solid electrolyte and the second solid electrolyte was changed to 90:10 (vol %), and the solid fraction was changed to 28 wt %, all-solid-state batteries of Examples 73 to 81 were prepared by a method similar to Examples 1 to 9.

Reference Examples 1 to 9

In the negative electrode preparation step, except that the first solid electrolyte was not used, the weight of the second solid electrolyte was changed to 9.5 g, and the solid fraction was changed to 43 wt %, all-solid-state batteries of Reference Examples 1 to 9 were prepared by a method similar to Examples 1 to 9.

Reference Examples 10 to 18

In the negative electrode preparation step, except that the second solid electrolyte was not used, the weight of the first solid electrolyte was changed to 9.5 g, and the solid fraction was changed to 26 wt %, all-solid-state batteries of Reference Examples 10 to 18 were prepared by a method similar to Examples 1 to 9.

Comparative Examples 1 to 3

In the negative electrode preparation step, except that the negative electrode active material with a mean particle diameter of 2 μm was used, all-solid-state batteries of Comparative Examples 1 to 3 were prepared by a method similar to Examples 10, 14, and 18.

Comparative Examples 4 to 6

In the negative electrode preparation step, except that the negative electrode active material with a mean particle diameter of 2 μm was used, all-solid-state batteries of Comparative Examples 4 to 6 were prepared by a method similar to Examples 37, 41, and 45.

Comparative Examples 7 to 9

In the negative electrode preparation step, except that the negative electrode active material with a mean particle diameter of 2 μm was used, all-solid-state batteries of Comparative Examples 7 to 9 were prepared by a method similar to Examples 64, 68, and 72.

Comparative Examples 10 to 12

In the negative electrode preparation step, except that the negative electrode active material with a mean particle diameter of 3 μm was used, all-solid-state batteries of Comparative Examples 10 to 12 were prepared by a method similar to Examples 10, 14, and 18.

Comparative Examples 13 to 15

In the negative electrode preparation step, except that the negative electrode active material with a mean particle diameter of 3 μm was used, all-solid-state batteries of Comparative Examples 13 to 15 were prepared by a method similar to Examples 37, 41, and 45.

Comparative Examples 16 to 18

In the negative electrode preparation step, except that the negative electrode active material with a mean particle diameter of 3 μm was used, all-solid-state batteries of Comparative Examples 16 to 18 were prepared by a method similar to Examples 64, 68, and 72. Note that, the all-solidstate batteries of Comparative Examples 16 and 17 were prepared by using the first solid electrolytes respectively having the mean particle diameters of 0.5 μm and 0.5 μm.

Evaluation of Battery Resistance

The prepared all-solid-state batteries were subjected to CCCV charging and discharging in the range from an upper limit voltage of 4.05 V to a lower limit voltage of 2.5 V with 0.1 C. The designed capacity of each of the all-solid-state batteries was set to 0.3 Ah. The battery resistances were calculated from the obtained results. The results were shown in Tables 1 to 3. FIG. 1 shows the relationship between the ratio of the first solid electrolyte and the battery resistance (mean value). In FIG. 1, Examples are shown by circle mark, Reference Examples are shown by square mark, and Comparative Examples are shown by triangle mark.

TABLE 1

| | Negative Electrode Active Material | | First Solid Electrolyte | | Second Solid Electrolyte | | First Solid | | | | |
| | Mean Particle Diameter (μm) | BET Specific Surface Area (m²/g) | Mean Particle Diameter (μm) | BET Specific Surface Area (m²/g) | Mean Particle Diameter (μm) | BET Specific Surface Area (m²/g) | Electrolyte:Second Solid Electrolyte (vol %) | Battery Resistance (Ω·cm²) | Mean Value of Battery Resistance (Ω·cm²) | Ratio of First Solid Electrolyte (%) | Mean Value of Slurry Viscosity (mPa·s) @38.3 s⁻¹ |
|---|---|---|---|---|---|---|---|---|---|---|---|
| Example 1 | 0.47 | 62 | 0.1 | 37.2 | 1 | 10.2 | 10:90 | 234 | 233 | 10 | 389 |
| Example 2 | 0.51 | 50 | 0.1 | 37.2 | 1.3 | 8.9 | 10:90 | 231 | | | |
| Example 3 | 0.63 | 34 | 0.1 | 37.2 | 1.6 | 7.5 | 10:90 | 232 | | | |
| Example 4 | 0.47 | 62 | 0.3 | 32.1 | 1 | 10.2 | 10:90 | 235 | | | |
| Example 5 | 0.5 | 50 | 0.3 | 32.1 | 1.3 | 8.9 | 10:90 | 233 | | | |
| Example 6 | 0.63 | 34 | 0.3 | 32.1 | 1.6 | 7.5 | 10:90 | 231 | | | |
| Example 7 | 0.47 | 62 | 0.5 | 22.5 | 1 | 10.2 | 10:90 | 232 | | | |
| Example 8 | 0.5 | 50 | 0.5 | 22.5 | 1.3 | 8.9 | 10:90 | 234 | | | |
| Example 9 | 0.63 | 34 | 0.5 | 22.5 | 1.6 | 7.5 | 10:90 | 233 | | | |
| Example 10 | 0.47 | 62 | 0.1 | 37.2 | 1 | 10.2 | 20:80 | 220 | 220 | 20 | 423 |
| Example 11 | 0.51 | 50 | 0.1 | 37.2 | 1.3 | 8.9 | 20:80 | 219 | | | |
| Example 12 | 0.63 | 34 | 0.1 | 37.2 | 1.6 | 7.5 | 20:80 | 220 | | | |
| Example 13 | 0.47 | 62 | 0.3 | 32.1 | 1 | 10.2 | 20:80 | 218 | | | |
| Example 14 | 0.5 | 50 | 0.3 | 32.1 | 1.3 | 8.9 | 20:80 | 220 | | | |
| Example 15 | 0.63 | 34 | 0.3 | 32.1 | 1.6 | 7.5 | 20:80 | 219 | | | |
| Example 16 | 0.47 | 62 | 0.5 | 22.5 | 1 | 10.2 | 20:80 | 221 | | | |
| Example 17 | 0.5 | 50 | 0.5 | 22.5 | 1.3 | 8.9 | 20:80 | 219 | | | |
| Example 18 | 0.63 | 34 | 0.5 | 22.5 | 1.6 | 7.5 | 20:80 | 220 | | | |
| Example 19 | 0.47 | 62 | 0.1 | 37.2 | 1 | 10.2 | 30:70 | 215 | 215 | 30 | 562 |
| Example 20 | 0.51 | 50 | 0.1 | 37.2 | 1.3 | 8.9 | 30:70 | 217 | | | |
| Example 21 | 0.63 | 34 | 0.1 | 37.2 | 1.6 | 7.5 | 30:70 | 214 | | | |
| Example 22 | 0.47 | 62 | 0.3 | 32.1 | 1 | 10.2 | 30:70 | 217 | | | |
| Example 23 | 0.5 | 50 | 0.3 | 32.1 | 1.3 | 8.9 | 30:70 | 213 | | | |
| Example 24 | 0.63 | 34 | 0.3 | 32.1 | 1.6 | 7.5 | 30:70 | 215 | | | |
| Example 25 | 0.47 | 62 | 0.5 | 22.5 | 1 | 10.2 | 30:70 | 215 | | | |
| Example 26 | 0.5 | 50 | 0.5 | 22.5 | 1.3 | 8.9 | 30:70 | 214 | | | |
| Example 27 | 0.63 | 34 | 0.5 | 22.5 | 1.6 | 7.5 | 30:70 | 218 | | | |
| Example 28 | 0.47 | 62 | 0.1 | 37.2 | 1 | 10.2 | 40:60 | 210 | 207 | 40 | 640 |
| Example 29 | 0.51 | 50 | 0.1 | 37.2 | 1.3 | 8.9 | 40:60 | 209 | | | |
| Example 30 | 0.63 | 34 | 0.1 | 37.2 | 1.6 | 7.5 | 40:60 | 203 | | | |
| Example 31 | 0.47 | 62 | 0.3 | 32.1 | 1 | 10.2 | 40:60 | 209 | | | |
| Example 32 | 0.5 | 50 | 0.3 | 32.1 | 1.3 | 8.9 | 40:60 | 208 | | | |
| Example 33 | 0.63 | 34 | 0.3 | 32.1 | 1.6 | 7.5 | 40:60 | 207 | | | |
| Example 34 | 0.47 | 62 | 0.5 | 22.5 | 1 | 10.2 | 40:60 | 209 | | | |
| Example 35 | 0.5 | 50 | 0.5 | 22.5 | 1.3 | 8.9 | 40:60 | 204 | | | |
| Example 36 | 0.63 | 34 | 0.5 | 22.5 | 1.6 | 7.5 | 40:60 | 208 | | | |
| Example 37 | 0.47 | 62 | 0.1 | 37.2 | 1 | 10.2 | 50:50 | 175 | 174 | 50 | 932 |
| Example 38 | 0.51 | 50 | 0.1 | 37.2 | 1.3 | 8.9 | 50:50 | 174 | | | |
| Example 39 | 0.63 | 34 | 0.1 | 37.2 | 1.6 | 7.5 | 50:50 | 175 | | | |
| Example 40 | 0.47 | 62 | 0.3 | 32.1 | 1 | 10.2 | 50:50 | 173 | | | |
| Example 41 | 0.5 | 50 | 0.3 | 32.1 | 1.3 | 8.9 | 50:50 | 176 | | | |
| Example 42 | 0.63 | 34 | 0.3 | 32.1 | 1.6 | 7.5 | 50:50 | 174 | | | |
| Example 43 | 0.47 | 62 | 0.5 | 22.5 | 1 | 10.2 | 50:50 | 173 | | | |
| Example 44 | 0.5 | 50 | 0.5 | 22.5 | 1.3 | 8.9 | 50:50 | 174 | | | |
| Example 45 | 0.63 | 34 | 0.5 | 22.5 | 1.6 | 7.5 | 50:50 | 175 | | | |
| Example 46 | 0.47 | 62 | 0.1 | 37.2 | 1 | 10.2 | 60:40 | 160 | 160 | 60 | 1213 |
| Example 47 | 0.51 | 50 | 0.1 | 37.2 | 1.3 | 8.9 | 60:40 | 162 | | | |
| Example 48 | 0.63 | 34 | 0.1 | 37.2 | 1.6 | 7.5 | 60:40 | 159 | | | |
| Example 49 | 0.47 | 62 | 0.3 | 32.1 | 1 | 10.2 | 60:40 | 158 | | | |
| Example 50 | 0.5 | 50 | 0.3 | 32.1 | 1.3 | 8.9 | 60:40 | 162 | | | |
| Example 51 | 0.63 | 34 | 0.3 | 32.1 | 1.6 | 7.5 | 60:40 | 161 | | | |

TABLE 1-continued

| | Negative Electrode Active Material | | First Solid Electrolyte | | Second Solid Electrolyte | | First Solid Electrolyte:Second Solid Electrolyte (vol %) | Battery Resistance (Ω · cm²) | Mean Value of Battery Resistance (Ω · cm²) | Ratio of First Solid Electrolyte (%) | Mean Value of Slurry Viscosity (mPa · s) @38.3 s⁻¹ |
|---|---|---|---|---|---|---|---|---|---|---|---|
| | Mean Particle Diameter (μm) | BET Specific Surface Area (m²/g) | Mean Particle Diameter (μm) | BET Specific Surface Area (m²/g) | Mean Particle Diameter (μm) | BET Specific Surface Area (m²/g) | | | | | |
| Example 52 | 0.47 | 62 | 0.5 | 22.5 | 1 | 10.2 | 60:40 | 160 | | | |
| Example 53 | 0.5 | 50 | 0.5 | 22.5 | 1.3 | 8.9 | 60:40 | 160 | | | |
| Example 54 | 0.63 | 34 | 0.5 | 22.5 | 1.6 | 7.5 | 60:40 | 161 | | | |
| Example 55 | 0.47 | 62 | 0.1 | 37.2 | 1 | 10.2 | 70:30 | 145 | 143 | 70 | 1862 |
| Example 56 | 0.51 | 50 | 0.1 | 37.2 | 1.3 | 8.9 | 70:30 | 142 | | | |
| Example 57 | 0.63 | 34 | 0.1 | 37.2 | 1.6 | 7.5 | 70:30 | 143 | | | |
| Example 58 | 0.47 | 62 | 0.3 | 32.1 | 0.47 | 10.2 | 70:30 | 145 | | | |
| Example 59 | 0.5 | 50 | 0.3 | 32.1 | 0.5 | 8.9 | 70:30 | 142 | | | |
| Example 60 | 0.63 | 34 | 0.3 | 32.1 | 0.63 | 7.5 | 70:30 | 143 | | | |
| Example 61 | 0.47 | 62 | 0.5 | 22.5 | 1 | 10.2 | 70:30 | 143 | | | |
| Example 62 | 0.5 | 50 | 0.5 | 22.5 | 1.3 | 8.9 | 70:30 | 144 | | | |
| Example 63 | 0.63 | 34 | 0.5 | 22.5 | 1.6 | 7.5 | 70:30 | 142 | | | |
| Example 64 | 0.47 | 62 | 0.1 | 37.2 | 1 | 10.2 | 80:20 | 100 | 100 | 80 | 2533 |
| Example 65 | 0.51 | 50 | 0.1 | 37.2 | 1.3 | 8.9 | 80:20 | 101 | | | |
| Example 66 | 0.63 | 34 | 0.1 | 37.2 | 1.6 | 7.5 | 80:20 | 99 | | | |
| Example 67 | 0.47 | 62 | 0.3 | 32.1 | 1 | 10.2 | 80:20 | 98 | | | |
| Example 68 | 0.5 | 50 | 0.3 | 32.1 | 1.3 | 8.9 | 80:20 | 101 | | | |
| Example 69 | 0.63 | 34 | 0.3 | 32.1 | 1.6 | 7.5 | 80:20 | 100 | | | |
| Example 70 | 0.47 | 62 | 0.5 | 22.5 | 1 | 10.2 | 80:20 | 99 | | | |
| Example 71 | 0.5 | 50 | 0.5 | 22.5 | 1.3 | 8.9 | 80:20 | 98 | | | |
| Example 72 | 0.63 | 34 | 0.5 | 22.5 | 1.6 | 7.5 | 80:20 | 102 | | | |
| Example 73 | 0.47 | 62 | 0.1 | 37.2 | 1 | 10.2 | 90:10 | 91 | 92 | 90 | 3740 |
| Example 74 | 0.51 | 50 | 0.1 | 37.2 | 1.3 | 8.9 | 90:10 | 92 | | | |
| Example 75 | 0.63 | 34 | 0.1 | 37.2 | 1.6 | 7.5 | 90:10 | 94 | | | |
| Example 76 | 0.47 | 62 | 0.3 | 32.1 | 1 | 10.2 | 90:10 | 95 | | | |
| Example 77 | 0.5 | 50 | 0.3 | 32.1 | 1.3 | 8.9 | 90:10 | 92 | | | |
| Example 78 | 0.63 | 34 | 0.3 | 32.1 | 1.6 | 7.5 | 90:10 | 91 | | | |
| Example 79 | 0.47 | 62 | 0.5 | 22.5 | 1 | 10.2 | 90:10 | 9 | | | |
| Example 80 | 0.5 | 50 | 0.5 | 22.5 | 1.3 | 8.9 | 90:10 | 90 | | | |
| Example 81 | 0.63 | 34 | 0.5 | 22.5 | 1.6 | 7.5 | 90:10 | 93 | | | |

TABLE 2

| | Negative Electrode Active Material | | First Solid Electrolyte | | Second Solid Electrolyte | | First Solid Electrolyte:Second Solid Electrolyte (vol %) | Battery Resistance (Ω · cm²) | Mean Value of Battery Resistance (Ω · cm²) | Ratio of First Solid Electrolyte (%) | Mean Value of Slurry Viscosity (mPa · s) @38.3 s⁻¹ |
|---|---|---|---|---|---|---|---|---|---|---|---|
| | Mean Particle Diameter (μm) | BET Specific Surface Area (m²/g) | Mean Particle Diameter (μm) | BET Specific Surface Area (m²/g) | Mean Particle Diameter (μm) | BET Specific Surface Area (m²/g) | | | | | |
| Reference Example 1 | 0.47 | 62 | 0.1 | 37.2 | 1 | 10.2 | 0:100 | 232 | 231 | 0 | 354 |
| Reference Example 2 | 0.51 | 50 | 0.1 | 37.2 | 1.3 | 8.9 | 0:100 | 230 | | | |
| Reference Example 3 | 0.63 | 34 | 0.1 | 37.2 | 1.6 | 7.5 | 0:100 | 231 | | | |
| Reference Example 4 | 0.47 | 62 | 0.3 | 32.1 | 1 | 10.2 | 0:100 | 232 | | | |
| Reference Example 5 | 0.5 | 50 | 0.3 | 32.1 | 1.3 | 8.9 | 0:100 | 231 | | | |
| Reference Example 6 | 0.63 | 34 | 0.3 | 32.1 | 1.6 | 7.5 | 0:100 | 233 | | | |
| Reference Example 7 | 0.47 | 62 | 0.5 | 22.5 | 1 | 10.2 | 0:100 | 231 | | | |
| Reference Example 8 | 0.5 | 50 | 0.5 | 22.5 | 1.3 | 8.9 | 0:100 | 234 | | | |
| Reference Example 9 | 0.63 | 34 | 0.5 | 22.5 | 1.6 | 7.5 | 0:100 | 230 | | | |
| Reference Example 10 | 0.47 | 62 | 0.1 | 37.2 | 1 | 10.2 | 100:0 | 82 | 82 | 100 | 7021 |
| Reference Example 11 | 0.51 | 50 | 0.1 | 37.2 | 1.3 | 8.9 | 100:0 | 80 | | | |
| Reference Example 12 | 0.63 | 34 | 0.1 | 37.2 | 1.6 | 7.5 | 100:0 | 81 | | | |
| Reference Example 13 | 0.47 | 62 | 0.3 | 32.1 | 1 | 10.2 | 100:0 | 83 | | | |

TABLE 2-continued

| | Negative Electrode Active Material | | First Solid Electrolyte | | Second Solid Electrolyte | | First Solid | | | | |
|---|---|---|---|---|---|---|---|---|---|---|---|
| | Mean Particle Diameter (μm) | BET Specific Surface Area (m²/g) | Mean Particle Diameter (μm) | BET Specific Surface Area (m²/g) | Mean Particle Diameter (μm) | BET Specific Surface Area (m²/g) | Electro-lyte:Second Solid Electro-lyte (vol %) | Battery Resistance (Ω·cm²) | Mean Value of Battery Resistance (Ω·cm²) | Ratio of First Solid Electrolyte (%) | Mean Value of Slurry Viscosity (mPa·s) @38.3 s⁻¹ |
| Reference Example 14 | 0.5 | 50 | 0.3 | 32.1 | 1.3 | 8.9 | 100:0 | 82 | | | |
| Reference Example 15 | 0.63 | 34 | 0.3 | 32.1 | 1.6 | 7.5 | 100:0 | 83 | | | |
| Reference Example 16 | 0.47 | 62 | 0.5 | 22.5 | 1 | 10.2 | 100:0 | 82 | | | |
| Reference Example 17 | 0.5 | 50 | 0.5 | 22.5 | 1.3 | 8.9 | 100:0 | 83 | | | |
| Reference Example 18 | 0.63 | 34 | 0.5 | 22.5 | 1.6 | 7.5 | 100:0 | 82 | | | |

TABLE 3

| | Negative Electrode Active Material | | First Solid Electrolyte | | Second Solid Electrolyte | | First Solid | | | | |
|---|---|---|---|---|---|---|---|---|---|---|---|
| | Mean Particle Diameter (μm) | BET Specific Surface Area (m²/g) | Mean Particle Diameter (μm) | BET Specific Surface Area (m²/g) | Mean Particle Diameter (μm) | BET Specific Surface Area (m²/g) | Electro-lyte:Second Solid Electro-lyte (vol %) | Battery Resistance (Ω·cm²) | Mean Value of Battery Resistance (Ω·cm²) | Ratio of First Solid Electrolyte (%) | Mean Value of Slurry Viscosity (mPa·s) @38.3 s⁻¹ |
| Comparative Example 1 | 2 | 5.5 | 0.1 | 37.2 | 1 | 10.2 | 20:80 | 312 | 316 | 20 | 101 |
| Comparative Example 2 | 2 | 5.5 | 0.3 | 32.1 | 1.3 | 8.9 | 20:80 | 320 | | | |
| Comparative Example 3 | 2 | 5.5 | 0.5 | 22.5 | 1.6 | 7.5 | 20:80 | 315 | | | |
| Comparative Example 4 | 2 | 5.5 | 0.1 | 37.2 | 1 | 10.2 | 50:50 | 322 | 322 | 50 | 145 |
| Comparative Example 5 | 2 | 5.5 | 0.3 | 32.1 | 1.3 | 8.9 | 50:50 | 319 | | | |
| Comparative Example 6 | 2 | 5.5 | 0.5 | 22.5 | 1.6 | 7.5 | 50:50 | 324 | | | |
| Comparative Example 7 | 2 | 5.5 | 0.1 | 37.2 | 1 | 10.2 | 80:20 | 320 | 320 | 80 | 230 |
| Comparative Example 8 | 2 | 5.5 | 0.3 | 32.1 | 1.3 | 8.9 | 80:20 | 319 | | | |
| Comparative Example 9 | 2 | 5.5 | 0.5 | 22.5 | 1.6 | 7.5 | 80:20 | 320 | | | |
| Comparative Example 10 | 3 | 4.2 | 0.1 | 37.2 | 1 | 10.2 | 20:80 | 323 | 321 | 20 | 87 |
| Comparative Example 11 | 3 | 4.2 | 0.3 | 32.1 | 1.3 | 8.9 | 20:80 | 321 | | | |
| Comparative Example 12 | 3 | 4.2 | 0.5 | 22.5 | 1.6 | 7.5 | 20:80 | 320 | | | |
| Comparative Example 13 | 3 | 4.2 | 0.1 | 37.2 | 1 | 10.2 | 50:50 | 322 | 323 | 50 | 101 |
| Comparative Example 14 | 3 | 4.2 | 0.3 | 32.1 | 1.3 | 8.9 | 50:50 | 322 | | | |
| Comparative Example 15 | 3 | 4.2 | 0.5 | 22.5 | 1.6 | 7.5 | 50:50 | 324 | | | |
| Comparative Example 16 | 3 | 4.2 | 0.5 | 37.2 | 1 | 10.2 | 80:20 | 325 | 324 | 80 | 123 |
| Comparative Example 17 | 3 | 4.2 | 0.5 | 32.1 | 1.3 | 8.9 | 80:20 | 324 | | | |
| Comparative Example 18 | 3 | 4.2 | 0.5 | 22.5 | 1.6 | 7.5 | 80:20 | 323 | | | |

When Examples 1 to 81 are compared with Comparative Examples 1 to 18, it is confirmed that the battery resistance of each of Examples 1 to 81 using the negative electrode active material with a small mean particle diameter is low and the battery resistance of each of Comparative Examples 1 to 18 using the negative electrode active material with a large mean particle diameter is high. On the other hand, when, for example, the results of Examples 1 to 9 are considered, the magnitudes of the battery resistances are almost the same as long as the mean particle diameter of the negative electrode active material is less than or equal to 0.7 μm.

Subsequently, when Examples 1 to 81 are compared with Reference Examples 1 to 18, it is found that the battery resistance tends to decrease as the ratio of the first solid electrolyte increases. On the other hand, it is also found that the viscosity of the negative electrode slurry tends to increase as the ratio of the first solid electrolyte increases. When the magnitude of the battery resistance and the slurry viscosity are considered, Examples 1 to 81 in which the first solid electrolyte and the second solid electrolyte are mixed are presumably more excellent than Reference Examples 1 to 18 including only the first solid electrolyte or the second solid electrolyte.

SEM Analysis

The cross section of the negative electrode was analyzed with an SEM. Selected five points were observed while the magnification of the SEM was set to 2000 times. The SEM image of the obtained cross section of the negative electrode was captured into ImageJ, and the total of the lengths of solid electrolytes in contact with the active material (the contact length of the solid electrolyte) was calculated by image analysis. The results of Example 55 and Comparative Example 34 are shown in Table 4.

TABLE 4

|  | Contact Length of Solid Electrolyte ($\mu$m) | Battery Resistance Mean Value ($\Omega \cdot cm^2$) |
|---|---|---|
| Example 55 | 1308 | 100 |
| Comparative Example 34 | 904 | 324 |

As shown in Table 4, as the contact length of the solid electrolyte extends, the battery resistance is reduced. The contact length correlates with the number of solid electrolytes in contact with the negative electrode active material. Therefore, as the contact length extends, a larger number of solid electrolytes are considered to be in contact with the negative electrode active material. For this reason, the battery resistance presumably reduces as the contact area between the solid electrolyte and the negative electrode active material increases.

What is claimed is:

1. An electrode for an all-solid-state battery, the electrode comprising:
   a negative active material comprising Si or an Si alloy;
   a first solid electrolyte comprising $Li_2S$—$P_2S_5$; and
   a second solid electrolyte comprising $Li_2S$—$P_2S_5$;
      wherein:
      a mean particle diameter of the negative active material is greater than or equal to 0.47 $\mu$m and less than or equal to 0.63 $\mu$m;
      a mean particle diameter of the first solid electrolyte is greater than or equal to 0.1 $\mu$m and less than or equal to 0.5 $\mu$m;
      a mean particle diameter of the second solid electrolyte is greater than or equal to 0.47 $\mu$m and less than or equal to 1.6 $\mu$m;
      the mean particle diameter of the first solid electrolyte is smaller than the mean particle diameter of the second solid electrolyte; and a ratio of a volume of the first solid electrolyte to a total volume of the first solid electrolyte and the second solid electrolyte is higher than or equal to 10 vol % and lower than or equal to 90 vol %.

2. The electrode according to claim 1, wherein the ratio of the volume of the first solid electrolyte to the total volume of the first solid electrolyte and the second solid electrolyte is higher than or equal to 50 vol % and lower than or equal to 80 vol %.

3. The electrode according to claim 2, wherein the ratio of the volume of the first solid electrolyte to the total volume of the first solid electrolyte and the second solid electrolyte is higher than or equal to 50 vol % and lower than or equal to 60 vol %.

4. The electrode according to claim 1, wherein:
   the mean particle diameter of the second solid electrolyte is greater than or equal to 1.0 $\mu$m.

5. An all-solid-state battery comprising:
   a first electrode;
   a second electrode; and
   a solid electrolyte layer disposed between the first electrode and the second electrode, wherein the first electrode is the electrode according to claim 1.

6. The all-solid-state battery according to claim 5, wherein the active material is a positive electrode active material and is at least one of lithium cobalt oxide, lithium nickel cobalt aluminum oxide, lithium nickel cobalt manganese oxide, and lithium manganese oxide.

7. The all-solid-state battery according to claim 1, wherein:
   the first solid electrolyte is a sulfide solid electrolyte;
   the sulfide solid electrolyte contains $Li_2S$ and $P_2S_5$; and
   a ratio of $Li_2S$ to a sum of $Li_2S$ and $P_2S_5$ ranges from 70 mol % to 80 mol %.

8. The electrode according to claim 1, wherein the ratio of the volume of the first solid electrolyte to the total volume of the first solid electrolyte and the second solid electrolyte is higher than or equal to 50 vol % and lower than or equal to 90 vol %.

9. The electrode according to claim 1, wherein the ratio of the volume of the first solid electrolyte to the total volume of the first solid electrolyte and the second solid electrolyte is higher than or equal to 10 vol % and lower than or equal to 60 vol %.

10. The electrode according to claim 9, wherein the ratio of the volume of the first solid electrolyte to the total volume of the first solid electrolyte and the second solid electrolyte is higher than or equal to 40 vol % and lower than or equal to 60 vol %.

11. The electrode according to claim 1, wherein
   the ratio of the volume of the first solid electrolyte to the total volume of the first solid electrolyte and the second solid electrolyte is higher than or equal to 20 vol % and lower than or equal to 80 vol %.

* * * * *